(12) United States Patent
Bahai et al.

(10) Patent No.: US 7,977,921 B2
(45) Date of Patent: Jul. 12, 2011

(54) AC-TO-DC VOLTAGE CONVERSION AND CHARGING CIRCUITRY

(75) Inventors: Ahmad Bahai, Lafayette, CA (US); Ali Djabbari, Saratoga, CA (US); Qingguo Liu, Sunnyvale, CA (US); Jianhui Zhang, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 504 days.

(21) Appl. No.: 12/192,633

(22) Filed: Aug. 15, 2008

(65) Prior Publication Data
US 2010/0039840 A1 Feb. 18, 2010

(51) Int. Cl.
*H02J 7/04* (2006.01)
*H02J 7/16* (2006.01)
(52) U.S. Cl. ......... 320/140; 320/166; 323/207; 323/266
(58) Field of Classification Search .................. 320/140, 320/166, 167
See application file for complete search history.

(56) References Cited

U.S. PATENT DOCUMENTS

| | | | |
|---|---|---|---|
| 5,691,629 A * | 11/1997 | Belnap | 323/266 |
| 5,856,741 A * | 1/1999 | Hasegawa | 323/272 |
| 6,169,389 B1 | 1/2001 | Chen | |
| 7,218,081 B2 * | 5/2007 | Jang et al. | 323/266 |
| 2005/0110468 A1* | 5/2005 | Turner et al. | 320/166 |
| 2005/0151517 A1* | 7/2005 | Cook et al. | 323/207 |
| 2009/0027930 A1* | 1/2009 | Usui | 363/84 |
| 2009/0027931 A1* | 1/2009 | Usui | 363/84 |
| 2009/0315518 A1* | 12/2009 | Soma et al. | 320/134 |

* cited by examiner

*Primary Examiner* — Edward Tso
*Assistant Examiner* — Arun Williams
(74) *Attorney, Agent, or Firm* — Vedder Price, P.C.

(57) ABSTRACT

Voltage conversion and charging circuitry and method for converting an alternating current (AC) voltage to a direct current (DC) voltage for charging an energy storage element (e.g., battery or supercapacitor). An output capacitance, which is initially charged quickly for use in the slower charging of a battery, also maintains the charge on an input capacitance which provides power for the charging control circuitry during such charging process. In accordance with a preferred embodiment, the DC charging current is substantially constant during a first time interval following which the DC charging power is substantially constant during a second time interval.

19 Claims, 6 Drawing Sheets

AC-TO-DC VOLTAGE CONVERSION AND CHARGING CIRCUITRY

BACKGROUND

1. Field of the Invention

The present invention relates to AC-to-DC voltage conversion circuitry, and in particular, to such conversion circuitry for use in charging a capacitance to a high voltage.

2. Related Art

With increasing use of portable electronic devices, uses of rechargeable batteries has increased as well. As portable devices become smaller, further size reductions are limited by the energy storage elements (e.g., batteries), which must be of a minimum size to provide the necessary power. Further, minimum battery sizes are further dictated by the need for such batteries to last for a minimum desired time of use. As is well known, charging and discharging of chemical-based batteries are limited by the chemistry of the batteries. In particular, charging a chemical-based battery takes a relatively long time (e.g., hours), since the charging process involves the reversal of one or more chemical processes.

However, with the development of supercapacitor technology, it is possible to use a high-voltage, high-density supercapacitor as a major energy storage element. A supercapacitor, known for its fast charging and discharging capabilities (e.g., seconds), is a physical capacitor with energy ($=\frac{1}{2}CV^2$) stored when a DC voltage is applied. Therefore, the energy density is determined by both the capacitance (C) and the maximum voltage (V). With the energy density of supercapacitors approaching that of chemistry-based batteries, it is becoming more advantageous to develop charging solutions for them.

SUMMARY

In accordance with the presently claimed invention, voltage conversion and charging circuitry and a method for converting an alternating current (AC) voltage to a direct current (DC) voltage for charging an energy storage element (e.g., battery or supercapacitor) are provided. An output capacitance, which is initially charged quickly for use in the slower charging of a battery, also maintains the charge on an input capacitance which provides power for the charging control circuitry during such charging process. In accordance with a preferred embodiment, the DC charging current is substantially constant during a first time interval following which the DC charging power is substantially constant during a second time interval.

In accordance with one embodiment of the presently claimed invention, voltage conversion and charging circuitry for converting an alternating current (AC) voltage to a direct current (DC) voltage for charging a battery includes:

first and second input electrodes to convey an AC voltage;
first and second output electrodes to convey a DC output voltage;
AC-to-DC voltage conversion circuitry coupled to the first and second input electrodes and responsive to the AC voltage by providing a first converted DC voltage;
a first capacitance coupled to the AC-to-DC voltage conversion circuitry and responsive to the first converted DC voltage by charging to a first charged DC voltage;
first DC-to-DC voltage conversion circuitry coupled to the first capacitance and responsive to the first charged DC voltage by providing a second converted DC voltage which is greater than the first charged DC voltage;
a second capacitance coupled to the first DC-to-DC voltage conversion circuitry and responsive to at least the second converted DC voltage by charging to a second charged DC voltage; and
second DC-to-DC voltage conversion circuitry coupled to the second capacitance and responsive to the second charged DC voltage by providing the DC output voltage which is less than the second charged DC voltage;
wherein, during an absence of the first converted DC voltage following the charging of the first capacitance to the first charged DC voltage, the first DC-to-DC voltage conversion circuitry is further responsive to the second charged DC voltage by substantially maintaining the first charged DC voltage on the first capacitance for at least a predetermined time interval.

In accordance with another embodiment of the presently claimed invention, voltage conversion and charging circuitry for converting an alternating current (AC) voltage to a direct current (DC) voltage for charging a battery includes:

AC-to-DC voltage converter means for receiving and converting an AC voltage to a first converted DC voltage;
first capacitor means for receiving the first converted DC voltage and in response thereto charging to a first charged DC voltage;
first DC-to-DC voltage converter means for receiving and converting the first charged DC voltage to a second converted DC voltage which is greater than the first charged DC voltage;
second capacitor means for receiving at least the second converted DC voltage and in response thereto charging to a second charged DC voltage; and
second DC-to-DC voltage converter means for receiving and converting the second charged DC voltage to a DC output voltage which is less than the second charged DC voltage;
wherein, during an absence of the first converted DC voltage following the charging of the first capacitance to the first charged DC voltage, the first DC-to-DC voltage converter means is further for receiving the second charged DC voltage and in response thereto substantially maintaining the first charged DC voltage on the first capacitor means for at least a predetermined time interval.

In accordance with still another embodiment of the presently claimed invention, a method for converting an alternating current (AC) voltage to a direct current (DC) voltage for charging a battery includes:

converting an AC voltage to a first converted DC voltage;
receiving the first converted DC voltage and in response thereto charging a first capacitance to a first charged DC voltage;
converting the first charged DC voltage to a second converted DC voltage which is greater than the first charged DC voltage;
receiving at least the second converted DC voltage and in response thereto charging a second capacitance to a second charged DC voltage;
converting the second charged DC voltage to a DC output voltage which is less than the second charged DC voltage; and
during an absence of the first converted DC voltage following the charging of the first capacitance to the first charged DC voltage, receiving the second charged DC voltage and in response thereto substantially maintaining the first charged DC voltage on the first capacitance for at least a predetermined time interval.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In accordance with the presently claimed invention, voltage conversion and charging circuitry is provided for converting an alternating current (AC) voltage to a direct current (DC) voltage for charging a battery. As part of this process, a high energy capacitor, often referred to as a "supercapacitor", is quickly charged, following which the AC power source can be removed while the charged capacitor provides charging power to a battery, or directly to the load. As a result, this capacitor, which can be charged in seconds rather than hours, quickly stores energy needed for the slower process of charging a battery for a portable device, such as a cellular telephone, laptop computer, power tool, etc.

Figure 1:
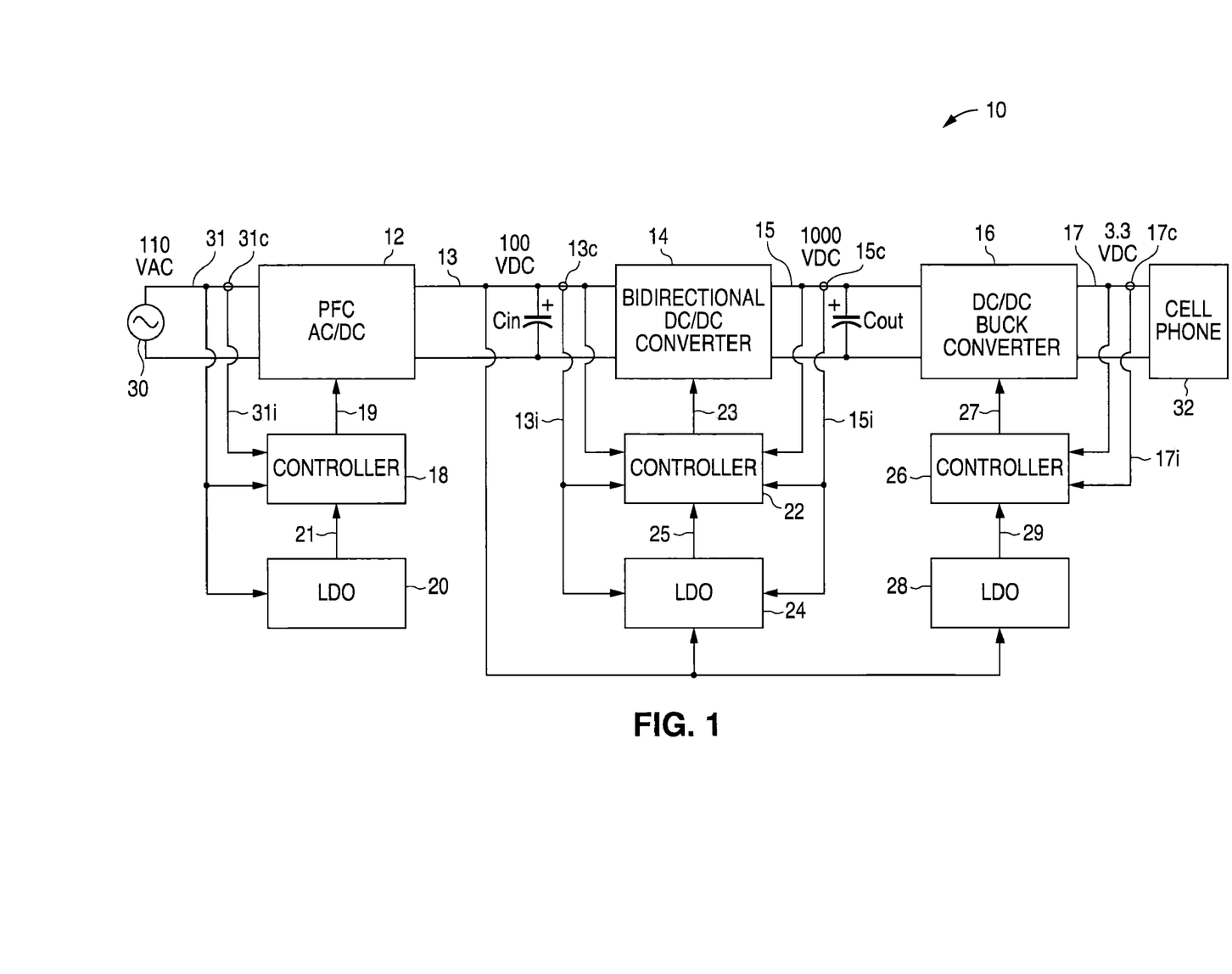
FIG. 1 is a functional block diagram of voltage conversion and charging circuitry in accordance with one embodiment of the presently claimed invention.

Referring to FIG. 1, voltage conversion and charging circuitry 10 in accordance with one embodiment with the presently claimed invention includes an AC-to-DC converter 12, a first DC-to-DC converter 14 and a second DC-to-DC converter 16. As discussed in more detail below, in accordance with a preferred embodiment of the presently claimed invention, the first DC-to-DC converter 14 is bi-directional, and the second DC-to-DC converter 16 is a buck converter. Also included are a controller 18 and low dropout (LDO) voltage regulator 20 for the first converter 12, another controller 22 and LDO voltage regulator 24 for the second converter, and another controller 26 and LDO voltage regulator 28 for the third converter 16.

An AC power source 30 provides an AC voltage 31 (e.g., 110 volts at 60 Hz as used in the United States). This AC voltage 31 is converted by the AC-to-DC converter 12 to produce a DC output voltage 13. As part of its conversion process, this converter 12 can also provide power factor control, e.g., so as to maintain a power factor close to unity for the power drawn from the AC power source 30. This power factor control is achieved by the controller 18 which monitors the input AC voltage 31 and the input AC current as represented by a signal 31i. This signal 31i is provided by a current sensing device 31c (many forms of which are well known in the art), and is indicative of the instantaneous AC current being provided to the converter 12. The AC input voltage 31 also provides power for the LDO voltage regulator 20, which provides regulated power 21 for the controller 18. Based on the AC voltage 31 and AC current signal 31i, the respective phases of which are indicative of the input power factor, the controller 18 provides one or more control signals 19 to the converter 12 for controlling the power factor as desired.

The DC voltage 13 produced by the first converter 12 charges a smaller input capacitor Cin which provides the initial energy to power the second LDO voltage regulator 24 and controller 22. This DC voltage 13 to which the capacitor Cin charges also drives the voltage regulators 24, 28 for the other controllers 22, 26. In accordance with well-known voltage regulator principles, these voltage regulators 24, 28 provide regulated power 25, 29 for their respective controllers 22, 26.

The DC voltage appearing across the input capacitance Cin is converted by the first DC-to-DC converter 14 to a higher output voltage 15 (e.g., from 100 VDC to 1,000 VDC) across an output capacitance Cout (e.g., a "supercapacitor"). Control for this converter 14 is provided by its controller 22 which monitors the input 13 and output 15 voltages, as well as the input current and output current as represented by input 13i and output 15i current sensing signals obtained via current sensing devices 13c, 15c (many forms of which are well known in the art). Based on these monitored voltages 13, 15 and current signals 13i, 15i, the controller provides one or more control signals 23 to the converter 14.

As discussed in more detail below, based on these signals 13, 13i, 15, 15i, the controller 22 causes the converter 14 to initially provide a constant charging current to the output capacitance Cout, following which it provides a constant charging power, i.e., by maintaining appropriate charging current and voltage applied to the output capacitance Cout.

The voltage 15 across the output capacitance Cout is converted by the second DC-to-DC converter 16 to a substantially lower voltage 17. For example, an exemplary application of the presently claimed invention would provide 3.3 VDC as this output voltage 17 for use in charging the battery of a cellular telephone 32. Similar to the first DC-to-DC converter 14, this DC-to-DC converter 16 provides this output voltage 17 and its associated DC current in a manner that is controllable by its controller 26. For example, the controller 26 monitors the output voltage 17 and the output current via a current sensing signal 17i obtained via a current sensing device 17c. Based on the desired charging characteristics for the battery to be charged (e.g., in a cellular telephone 32), the controller 26 uses these signals 17, 17i to provided one or more control signals 27 for the converter 16.

Following a substantially full charging of the output capacitance Cout (which can be accomplished in seconds or minutes rather than hours), the AC power source 30 can be removed, e.g., as what would happen when a power unit is unplugged from the AC electrical outlet. Removal of the AC power source 30 results in no more charging voltage 13 being provided by the AC-to-DC converter 12. Associated with the initial loss of this charging voltage 13, is the loss of the charging current for the input capacitance Cin, as well as the input current for the DC-to-DC converter 14. This loss in current is reflected in the current sensing signal 13i monitored by the controller 22. As a result of this loss in input current, the DC-to-DC converter 14, which is preferably bi-directional in operation, then uses the power available in the charged output capacitance Cout to maintain the voltage charge across the input capacitance Cin, thereby also maintaining the source of power for the voltage regulators 24, 28 which provide power for the controllers 22, 26 for the DC-to-DC converters for 14, 16 responsible for continued charging of the battery for the user device 32. Initially, the smaller input supercapacitor Cin provides enough energy to power the second LDO voltage regulator 24 and controller 22, thereby enabling the reverse charging process that maintains the high voltage (e.g., 1,000 VDC) across the input supercapacitor Cin.

Figure 2:
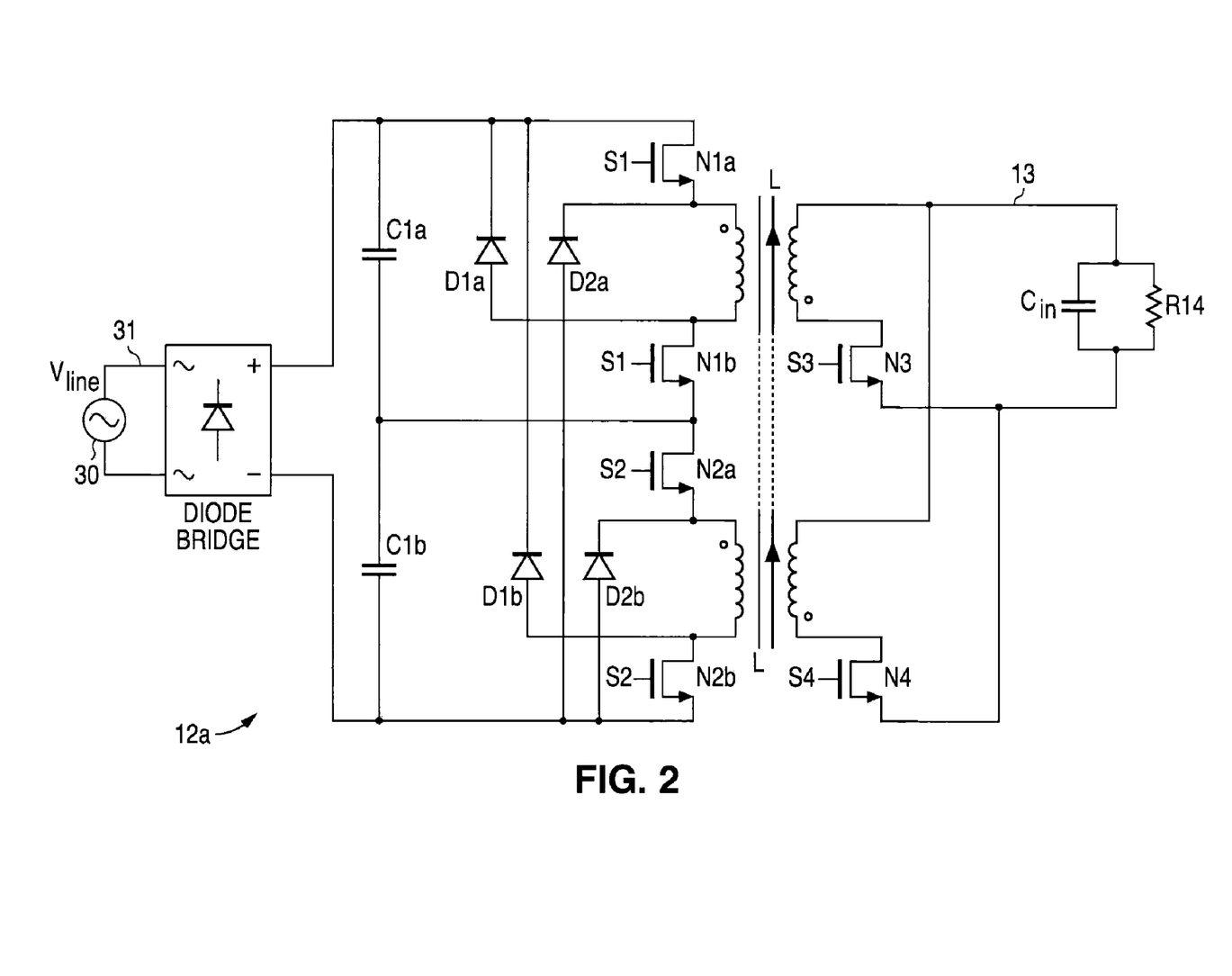
FIG. 2 is a schematic diagram of an exemplary embodiment of the AC-to-DC converter of FIG. 1.

Referring to FIG. 2, one exemplary embodiment 12a of the AC-to-DC converter 12 includes a diode bridge which provides full rectification of the input AC voltage 31. The fully rectified voltage appears across the input capacitors C1a, C1b and is clamped by the clamping diodes D1a, D2a, D1b, D2b as it is switched by the switching transistors N1a, N1b, N2a, N2b across the primary windings of the transformer L. The resulting voltage across the secondary windings of this transformer L is switched by output switching transistors N3, N4 to provide the DC output voltage 13 across the input capacitance Cin (shown in parallel with the equivalent input resistance R14 of the first DC-to-DC converter 14 which represents the load for this AC-to-DC converter 12a).

Figure 3:
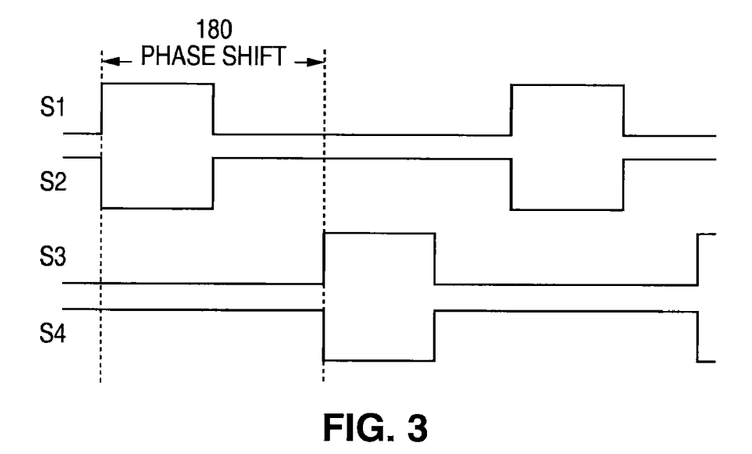
FIG. 3 is a signal timing diagram for the circuit of FIG. 2.

Referring to FIG. 3, the switching signals S1, S2, S3, S4 are applied to the gate electrodes of the switching transistors N1a, N1b, N2a, N2b, N3, N4 with mutual phase relationships substantially as shown.

Figure 4:
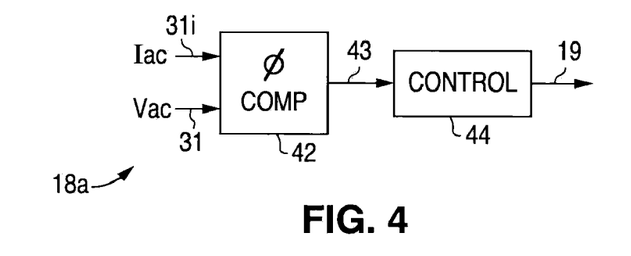
FIG. 4 is a functional block diagram of the controller for the AC-to-DC converter of FIG. 1.

Referring to FIG. 4, one exemplary embodiment 18a of the controller 18 for the AC-to-DC converter 12 includes phase comparison circuitry 42 and control circuitry 44. As discussed above, the input AC voltage 31 and current sensing signal 31i are monitored by the phase comparison circuitry 42. The instantaneous phases of these two signals 31, 31i, which are indicative of the power factor of the input power, are monitored and compared to determine the power factor. The resulting comparison signal 43, which is indicative of the power factor, is used by the control circuitry 44 to produce the one or more appropriate control signals 19 for controlling the power factor within the converter 12.

Figure 5:
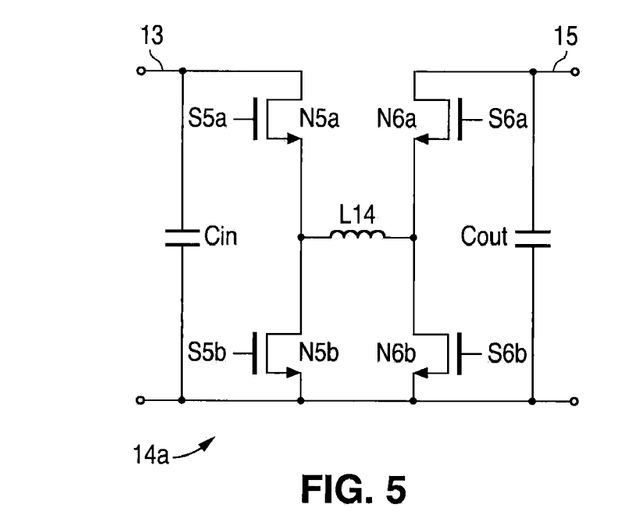
FIG. 5 is a schematic diagram of an exemplary embodiment of the first DC-to-DC converter of FIG. 1.

Referring to FIG. 5, one exemplary embodiment 14a of the bi-directional DC-to-DC converter 14 includes switching transistors N5a, N5b, N6a, N6b and an inductance L14, interconnected substantially as shown with the input Cin and output Cout capacitances. Appropriate switching of these transistors N5a, N5b, N6a, N6b allows this converter 14a to step up its input voltage 13 to the desired output voltage N15, as discussed above.

Figure 6A:
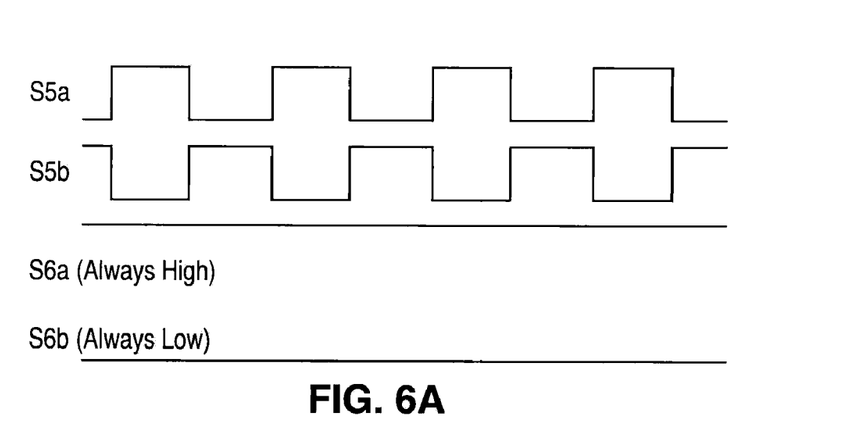
FIG. 6A is a signal timing diagram for the circuit of FIG. 5 operating as a buck converter.
Figure 6B:
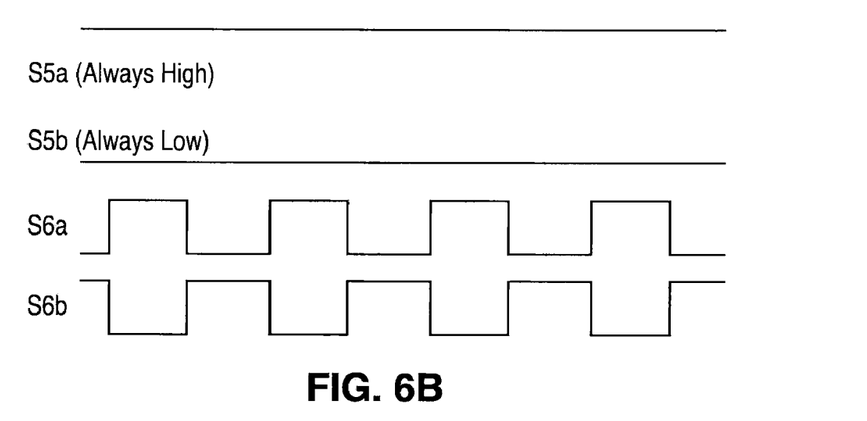
FIG. 6B is a signal timing diagram for the circuit of FIG. 5 operating as a boost converter.

Referring to FIGS. 6A and 6B, in accordance with a preferred embodiment, the switching signals S5a, S5b, S6a, S6b are applied to the gate electrodes of the switching transistors N5a, N5b, N6a, N6b with mutual signal phases substantially as shown. When operated in a buck-boost mode, the switching signals S5a, S5b, S6a, S6b drive the gate electrodes of the switching transistors N5a, N5b, N6a, N6b such that the converter 14a operates alternately as a buck converter and as a boost converter in a time multiplexed manner, e.g., in accordance with the control techniques disclosed in commonly assigned, copending U.S. patent application Ser. No. 12/133, 111, filed Jun. 4, 2008, and entitled "Apparatus And Method For Digitally Controlled Buck-Boost Switching Regulator", the disclosure of which is incorporated herein by reference.

Figure 7:
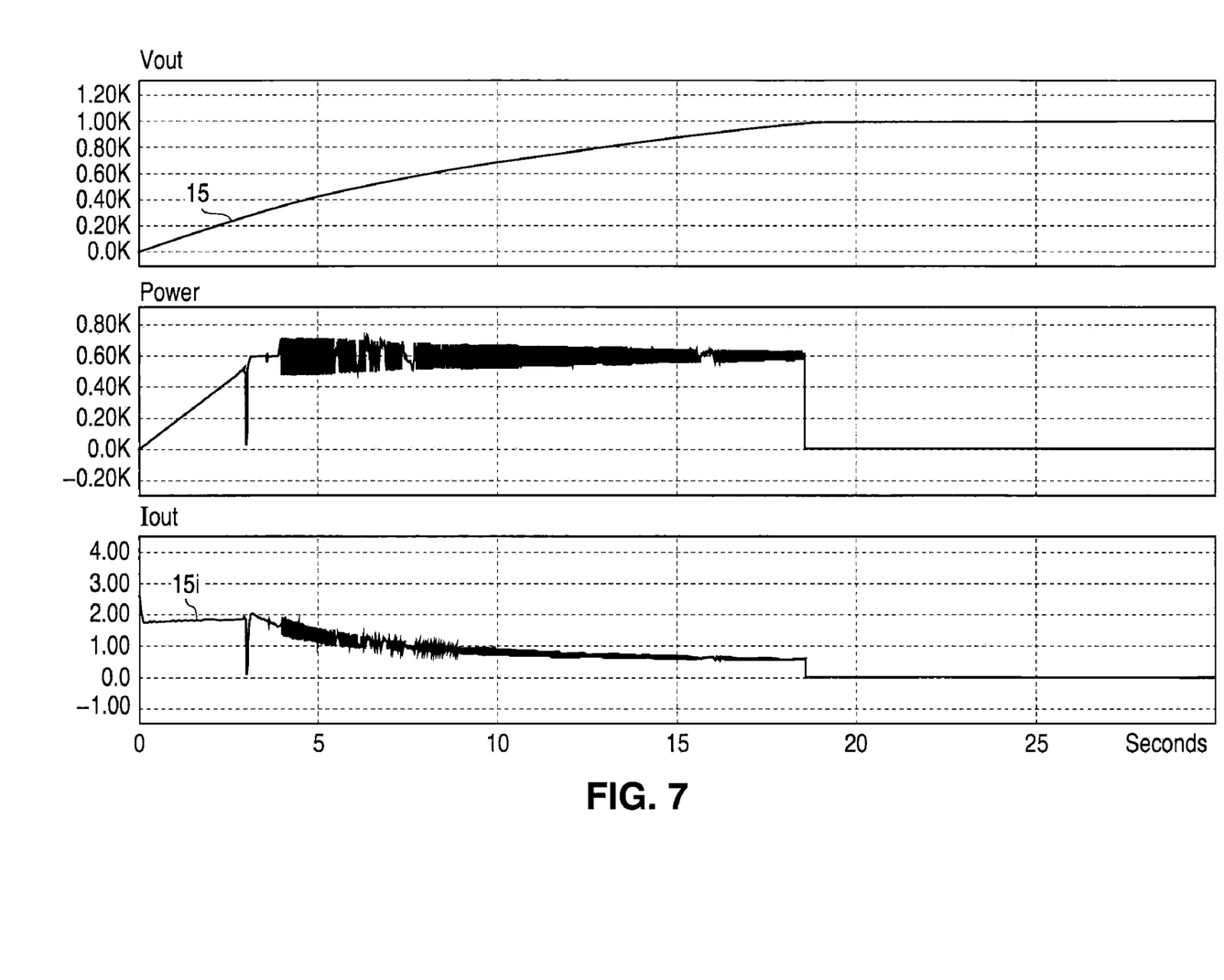
FIG. 7 is a signal timing diagram for voltage, current and power provided by the first DC-to-DC converter of FIG. 1 in accordance with a preferred embodiment of the presently claimed invention.

Referring to FIG. 7, as discussed above, in accordance with a preferred embodiment of the presently claimed invention, charging of the output capacitance Cout by the charging voltage 15 is done in discreet stages, or time intervals. During a first stage, a constant charging current is applied to the output capacitance Cout. Thereafter, during a second stage, a constant charging power is applied, i.e., by proportionally reducing the charging current as the charging voltage 15 increases. For example, in accordance with one embodiment, this first time interval might be approximately 3 seconds during which the charging current is substantially constant, followed by the second time interval of approximately 15 seconds (for a total of approximately 18 seconds) during which the charging current decreases gradually as the charging voltage 15 increases.

Figure 8:
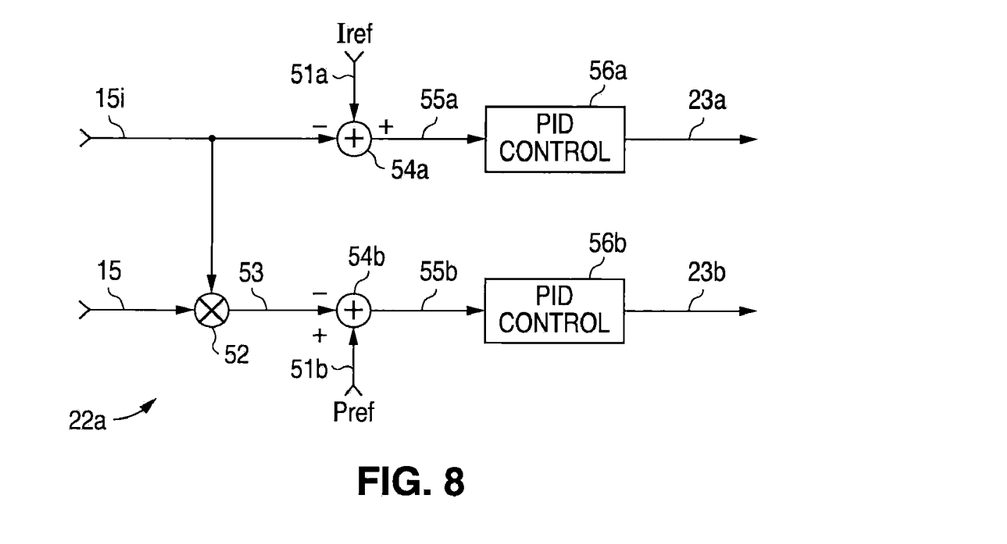
FIG. 8 is a functional block diagram of an exemplary embodiment of the controller for the first DC-to-DC converter of FIG. 1.

Referring to FIG. 8, one exemplary embodiment 22a of the controller 22 for the first DC-to-DC converter 14 includes multiplication circuitry 52, comparison circuits 54a, 54b (e.g., signal subtraction circuits with which the outputs, as differences between the respective inputs, represent comparisons of the respective inputs), and control circuits 56a, 56b. The current sensing signal 15i is compared to a reference current signal 51a in the first comparison circuit 54a. The resulting comparison signal 55a, which is indicative of the phase difference between the incoming and reference currents, is used by the first controller 56a to provide one or more control signals 23a for the converter 14. Similarly, the input voltage 15 is multiplied with the current sensing signal 15i in the multiplication circuitry 52 to produce a product signal 53 indicative of the power being applied for charging the output capacitance Cout. This power indicator signal 53 is compared to a reference power signal 51b in the second comparison circuit 54b. The comparison result signal 55b is used by the second controller 56b to produce one or more additional control signals 23b for the converter 14. Together these control signals 23a, 23b preferably control the DC-to-DC converter 14 such that it provides constant current and constant power during the charging of the output capacitance Cout, as discussed above.

Figure 9A:
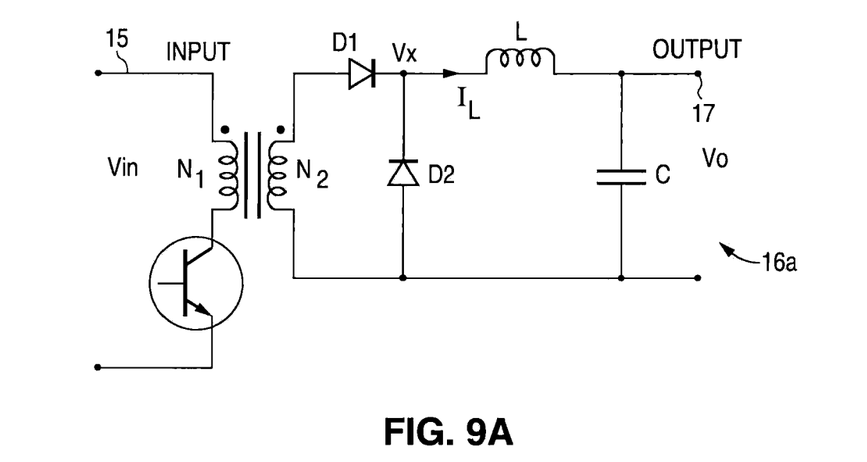
FIGS. 9A and 9B are schematic diagrams of exemplary embodiments for the second DC-to-DC converter of FIG. 1.
Figure 9B:
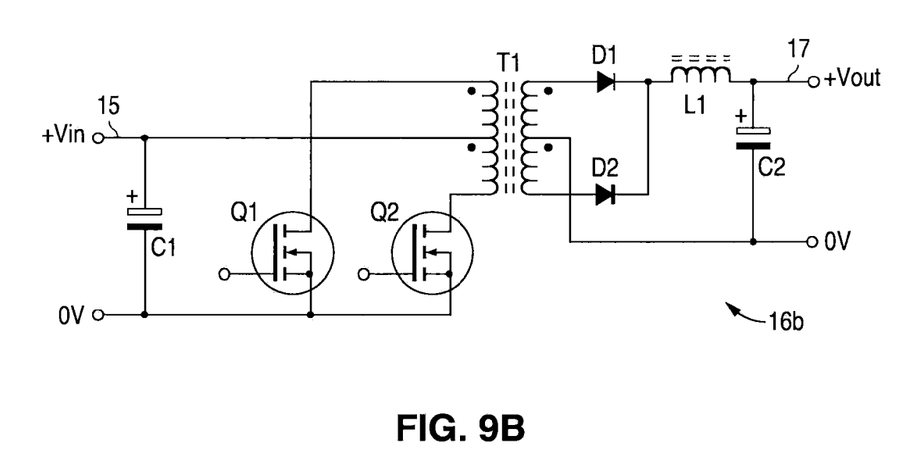

Referring to FIGS. 9A and 9B, exemplary embodiments 16a, 16b of the second DC-to-DC converter 16 can be implemented as shown. As discussed above, this converter 16 is preferably a buck converter to provide an output voltage 17 lower than the input voltage 15. Such circuits 16a, 16b are well known in the art, and it should be understood that other types of buck converters can be used as well.

The controller 26 for the output converter 16 can be implemented in the manner shown in FIG. 8, with the output voltage 17 and current sensing signal 17i being the signals monitored and used for producing the one or more control signals 27 for the converter 16.

In accordance with a preferred embodiment of the presently claimed invention, the controllers 44 (FIG. 4), 56a, 56b (FIG. 8) discussed above, are implemented as proportional, integral, derivative (PID) controllers. As is well known in the art, PID controllers provide closed loop control with an algorithm including a proportional value (based on the current error), an integral value (based on a sum of recent errors) and a derivative value (based on the rate of change in error), with a weighted sum of these values processed to produce the final one or more control signals. As is well known, by adjusting the respective constants for each of these parameters, various actions can be provided in accordance with specific control requirements.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including voltage conversion and charging circuitry for converting an alternating current (AC) voltage to a direct current (DC) voltage for charging a battery, comprising:
   first and second input electrodes to convey an AC voltage;
   first and second output electrodes to convey a DC output voltage;
   AC-to-DC voltage conversion circuitry coupled to said first and second input electrodes and responsive to said AC voltage by providing a first converted DC voltage;
   a first capacitance coupled to said AC-to-DC voltage conversion circuitry and responsive to said first converted DC voltage by charging to a first charged DC voltage;
   first DC-to-DC voltage conversion circuitry coupled to said first capacitance and responsive to said first charged DC voltage by providing a second converted DC voltage which is greater than said first charged DC voltage;
   a second capacitance coupled to said first DC-to-DC voltage conversion circuitry and responsive to at least said second converted DC voltage by charging to a second charged DC voltage; and
   second DC-to-DC voltage conversion circuitry coupled to said second capacitance and responsive to said second charged DC voltage by providing said DC output voltage which is less than said second charged DC voltage;
   wherein, during an absence of said first converted DC voltage following said charging of said first capacitance to said first charged DC voltage, said first DC-to-DC voltage conversion circuitry is further responsive to said second charged DC voltage by substantially maintaining said first charged DC voltage on said first capacitance for at least a predetermined time interval.

2. The apparatus of claim 1, wherein:
   said first DC-to-DC voltage conversion circuitry is responsive to said first charged DC voltage by providing a DC charging current;
   said second charged DC voltage and said DC charging current together define a DC power;
   said second capacitance is further responsive to said DC charging current by charging to said second charged DC voltage;
   during a first time interval said DC charging current is substantially constant; and
   during a second time interval following said first time interval said DC power is substantially constant.

3. The apparatus of claim 1, wherein:
   said first and second input electrodes are further to convey an AC current;
   said AC voltage and said AC current together define a power factor; and
   said AC-to-DC voltage conversion circuitry comprises
      power factor correction circuitry responsive to said AC voltage and one or more control signals by conducting said AC current in accordance with a predetermined power factor, and
      control circuitry coupled to at least one of said first and second input electrodes and to said power factor correction circuitry, and responsive to said AC voltage and said AC current by providing said one or more control signals.

4. The apparatus of claim 3, wherein:
   said AC voltage includes an associated signal phase;
   said AC current includes an associated signal phase; and
   said control circuitry comprises
      comparison circuitry responsive to a comparison of said AC voltage signal phase and said AC current signal phase by providing a comparison result signal corresponding to said power factor, and
      conversion circuitry coupled to said comparison circuitry and responsive to said comparison result signal by providing said one or more control signals.

5. The apparatus of claim 1, wherein said first DC-to-DC voltage conversion circuitry comprises bi-directional DC-to-DC voltage conversion circuitry.

6. The apparatus of claim 5, wherein said bi-directional DC-to-DC voltage conversion circuitry comprises bi-directional buck-boost DC-to-DC voltage conversion circuitry.

7. The apparatus of claim 1, wherein:
   a first DC current is conveyed between said first capacitance and said first DC-to-DC voltage conversion circuitry;
   a second DC current is conveyed between said first DC-to-DC voltage conversion circuitry and said second capacitance;
   said first DC-to-DC voltage conversion circuitry is further responsive to said first and second charged DC voltages and one or more control signals by conveying said first and second DC currents; and
   said apparatus further comprises control circuitry coupled to said first and second capacitances and said first DC-to-DC voltage conversion circuitry, and responsive to said first and second charged DC voltages and said first and second DC currents by providing said one or more control signals.

8. The apparatus of claim 7, wherein said control circuitry comprises:
   first comparison circuitry responsive to a comparison of said second DC current to a reference current by providing a current comparison signal;
   multiplication circuitry responsive to said second charged DC voltage and said second DC current by providing a power signal;
   second comparison circuitry coupled to said multiplication circuitry and responsive to a comparison of said power signal to a reference power by providing a power comparison signal; and
   one or more controllers coupled to said first and second comparison circuitries and responsive to said current and power comparison signals by providing said one or more control signals.

9. The apparatus of claim 8, wherein at least one of said one or more controllers comprises a proportional, integral, derivative (PID) controller.

10. The apparatus of claim 8, wherein said one or more control signals comprises a plurality of control signals, and said one or more controllers comprises:
   a first controller coupled to said first comparison circuitry and responsive to said current comparison signal by providing a first one of said plurality of control signals; and
   a second controller coupled to said second comparison circuitry and responsive to said power comparison signal by providing a second one of said plurality of control signals.

11. The apparatus of claim 10, wherein said first and second controllers comprise first and second proportional, integral, derivative (PID) controllers, respectively.

12. The apparatus of claim 1, wherein:
   said first and second output electrodes are further to convey a DC output current;
   said second DC-to-DC voltage conversion circuitry is further responsive to said second charged DC voltage and one or more control signals by providing said DC output current; and
   said apparatus further comprises control circuitry coupled to said first capacitance, at least one of said first and second output electrodes, and said second DC-to-DC voltage conversion circuitry, and responsive to said first charged DC voltage, said DC output voltage and said DC output current by providing said one or more control signals.

13. The apparatus of claim 12, wherein said second DC-to-DC voltage conversion circuitry comprises DC-to-DC voltage buck conversion circuitry.

14. The apparatus of claim 12, wherein said control circuitry comprises:
   first comparison circuitry responsive to a comparison of said DC output current to a reference current by providing a current comparison signal;
   multiplication circuitry responsive to said DC output voltage and said DC output current by providing a power signal;
   second comparison circuitry responsive to a comparison of said power signal to a reference power by providing a power comparison signal; and
   one or more controllers coupled to said first and second comparison circuitries and responsive to said current and power comparison signals by providing said one or more control signals.

15. The apparatus of claim 14, wherein at least one of said one or more controllers comprises a proportional, integral, derivative (PID) controller.

16. The apparatus of claim 14, wherein said one or more control signals comprises a plurality of control signals, and said one or more controllers comprises:
   a first controller coupled to said first comparison circuitry and responsive to said current comparison signal by providing a first one of said plurality of control signals; and
   a second controller coupled to said second comparison circuitry and responsive to said power comparison signal by providing a second one of said plurality of control signals.

17. The apparatus of claim 16, wherein said first and second controllers comprise first and second proportional, integral, derivative (PID) controllers, respectively.

18. An apparatus including voltage conversion and charging circuitry for converting an alternating current (AC) voltage to a direct current (DC) voltage for charging a battery, comprising:
   AC-to-DC voltage converter means for receiving and converting an AC voltage to a first converted DC voltage;
   first capacitor means for receiving said first converted DC voltage and in response thereto charging to a first charged DC voltage;
   first DC-to-DC voltage converter means for receiving and converting said first charged DC voltage to a second converted DC voltage which is greater than said first charged DC voltage;
   second capacitor means for receiving at least said second converted DC voltage and in response thereto charging to a second charged DC voltage; and
   second DC-to-DC voltage converter means for receiving and converting said second charged DC voltage to a DC output voltage which is less than said second charged DC voltage;
   wherein, during an absence of said first converted DC voltage following said charging of said first capacitance to said first charged DC voltage, said first DC-to-DC voltage converter means is further for receiving said second charged DC voltage and in response thereto substantially maintaining said first charged DC voltage on said first capacitor means for at least a predetermined time interval.

19. A method for converting an alternating current (AC) voltage to a direct current (DC) voltage for charging a battery, comprising:
   converting an AC voltage to a first converted DC voltage;
   receiving said first converted DC voltage and in response thereto charging a first capacitance to a first charged DC voltage;
   converting said first charged DC voltage to a second converted DC voltage which is greater than said first charged DC voltage;
   receiving at least said second converted DC voltage and in response thereto charging a second capacitance to a second charged DC voltage;
   converting said second charged DC voltage to a DC output voltage which is less than said second charged DC voltage; and
      during an absence of said first converted DC voltage following said charging of said first capacitance to said first charged DC voltage, receiving said second charged DC voltage and in response thereto substantially maintaining said first charged DC voltage on said first capacitance for at least a predetermined time interval.

* * * * *